3,632,631
STERICALLY HINDERED BISPHENYL CARBAMATES
William E. Wright, Farmington, Mich., assignor to Ethyl Corporation, New York, N.Y.
No Drawing. Filed Sept. 8, 1967, Ser. No. 666,463
Int. Cl. C07c *125/06*
U.S. Cl. 260—479      5 Claims

ABSTRACT OF THE DISCLOSURE

Bisphenyl carbamates in which the carbamate radical is sterically hindered are useful as pesticides and antioxidants. Examples are 4,4'-methylenebis(2,6-di-tert-butylphenyl methylcarbamate) and 4,4'-thiobis(6-tert-butyl-o-tolyl methylcarbamate).

SUMMARY

This invention relates to a new class of compounds useful as pesticides and antioxidants. The new compounds are particularly useful as insecticides. Hence, an object of this invention is to provide new sterically hindered bisphenyl carbamates and insecticidal formulations containing them. A further object is to provide methods of killing undesirable insects.

The sterically hindered bisphenyl carbamates of this invention have the formula:

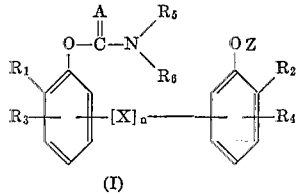

(I)

wherein $R_1$ and $R_2$ are selected from the group consisting of alpha-branched $C_{3-12}$ alkyl radicals, alpha-branched $C_{8-12}$ aralkyl radicals and $C_{6-12}$ cycloalkyl radicals, $R_3$ and $R_4$ are selected from the group consisting of hydrogen, $C_{1-12}$ alkyl radicals, $C_{7-12}$ aralkyl radicals and $C_{6-12}$ cycloalkyl radicals, X is selected from the group consisting of thio-, dithio- and $C_{1-6}$ divalent hydrocarbon radicals, $R_5$ is selected from the group consisting of $C_{1-20}$ alkyl radicals, $C_{6-20}$ aryl radicals and $C_{7-20}$ aralkyl radicals, $R_6$ is selected from the group consisting of hydrogen and $R_5$, $n$ is an integer from 0–1, A is selected from the group consisting of oxygen and sulfur and Z is selected from the group consisting of hydrogen and carbamyl radicals having the formula:

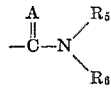

wherein A, $R_5$ and $R_6$ are as above.

These compounds fall into three subclasses. In the first subclass the two phenyl radicals are bonded directly to each other. These compounds have the formula:

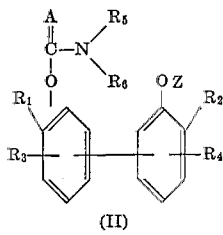

(II)

wherein $R_1$, $R_2$, $R_3$, $R_4$ $R_5$, $R_6$, A and Z are the same as in Formula I. Examples of this class of compounds include:

4,4'-bis(2,6-di-tert-butylphenyl methylcarbamate)
2,6-di-tert-butyl-4-(3,5-di-tert-butyl-4-hydroxyphenyl)-phenyl methylcarbamate
4,4'-bis[O-(2,6-di-cyclohexylphenyl)phenylthiocarbamate]
4,4'-bis(2,6-di-cyclohexylphenyl phenylcarbamate)
4-[4-hydroxy-5-(α-methylbenzyl)-m-tolyl]-6-(α-methylbenzyl)-o-tolyl benzylcarbamate
4,4'-bis[6-(α-methylbenzyl)-o-tolyl benzylcarbamate]
4,4'-bis(2-sec-dodecylphenyl dodecylcarbamate)
4,4'-bis(6-tert-butyl-o-tolyl dimethylcarbamate)

The second subclass of compounds are those in which the two phenyl radicals of the bisphenyl carbamates are bonded together through a divalent hydrocarbon radical. These compounds have the formula:

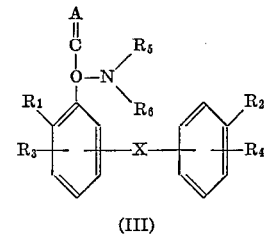

(III)

in which $R_1$, $R_2$, $R_3$, $R_4$, $R_5$ $R_6$, A and Z are selected from the same group as in Formula I, and X is a divalent hydrocarbon radical containing from 1–6 carbon atoms. Preferably, X is a cyclic or acyclic alkane radicals such as methylene, ethylene, ethylidene, propylidene, isopropylidene, butylidene, 1-methylbutylidene, cyclohexylidene, hexylidene, 1-methylpropylidene, and the like. Some examples of these compounds are:

4,4'-methylenebis(2,6-di-tert-butylphenyl methylcarbamate)
4,4'-ethylidenebis[O-(6-tert-butyl-o-tolyl) dimethylthiocarbamate]
4,4'-butylidenebis(2,6-di-cyclohexylphenyl phenylcarbamate)
4,4'-hexylidenebis[6-(α-methylbenzyl)-m-tolyl benzylcarbamate]
4,4'-methylenebis[O-(6-tert-butyl-m-tolyl) dimethylthiocarbamate]
4,4'-cyclohexylidenebis(2-sec-dodecylphenyl octadecylcarbamate)
2,2'-methylenebis(6-tert-butyl-p-tolyl methylcarbamate)
4,4'-butylidenebis(6-tert-butyl-m-tolyl eicosylcarbamate)
2,6-di-tert-butyl-4-(3,5-di-tert-butyl-4-hydroxybenzyl)-phenyl phenylcarbamate
4-(N,N-dimethyl-thiocarbamyloxy)-4'-hydroxy-2,2'-dimethyl-5,5'-cyclohexyl-cyclohexylidenebis benzene A third subclass of hindered bisphenyl carbamates consists of those in which the two phenyl radicals are bonded together through a thio or dithio radical. These are compounds having the formula:

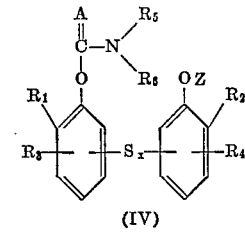

(IV)

wherein $R_1$, $R_2$, $R_3$, $R_4$, $R_5$, $R_6$ A and Z are the same as in Formula I, and $x$ is an integer from 1-2. Some examples of these compounds are:

4,4'-thiobis(6-tert-butyl-o-tolyl methylcarbamate)
4,4'-thiobis(6-tert-butyl-m-tolyl phenylcarbamate)
4,4'-thiobis[O-[2,6-di(α-methylbenzyl)phenyl] octadecylthiocarbamate]
4,4'-thiobis[O-(2,6-di-cyclohexylphenyl) benzylthiocarbamate]
4,4'-dithiobis[O-(2-tert-butylphenyl) dimethylthiocarbamate]
4,4'-thiobis(2-dodecyl-5-ethylphenyl dihexylcarbamate)
2,2'-thiobis[O-(6-tert-butyl-p-tolyl)amylthiocarbamate]
4,4'-dimethyl-6,6'-di(α-methylbenzyl)-1-(N-phenyl thiocarbamyloxy)-1'-hydroxy-2,2'-dithiobis benzene
4,4'-thiobis(2,6-di-tert-butylphenyl ethylcarbamate)
3,3',5,5'-tetra-tert-butyl-4-(N-methylcarbamyloxy)-4'-hydroxy thiobis benzene
5,5'-di-tert-butyl-4-(N-phenylcarbamyloxy)-4'-hydroxy-2,2'-dimethyl thiobis benzene The compounds of this invention can be made by known methods. A most useful method is by the reaction of the known bisphenol compounds with an isocyanate or a carbamyl chloride. The following examples will serve to illustrate typical methods of preparation. All parts are parts by weight.

EXAMPLE 1

To a reaction vessel equipped with a stirrer, thermometer, condenser and heating means add 82 parts of 4,4'-bis(2,6-di-tert-butylphenol), 22.8 parts of methylisocyanate, 1400 parts of benzene and 0.2 part of pyridine. Heat the mixture slowly to reflux. Stir at reflux for 6 hours and then cool to room temperature. Filter off the precipitate and recrystallize it from tetrahydrofuran, which yields 4,4'-bis(2,6-di-tert-butylphenyl methylcarbamate) melting at 346-348° C. (dec.).

In the above example other bisphenols can be employed to yield the corresponding bisphenyl carbamate. For example, 4,4'-bis(6-tert-butyl-o-cresol) yields 4,4'-bis(6-tert-butyl-o-tolyl methylcarbamate).

EXAMPLE 2

To the reaction vessel of Example 1 add 82 parts of 4,4'-bis(2,6-di-tert-butylphenol), 24 parts of phenylisocyanate, 1000 parts of toluene and 0.2 part of pyridine. While stirring, heat to reflux and hold at reflux 4 hours. Distill off 500 parts of toluene and then cool. The precipitate that forms is substantially 2,6-di-tert-butyl-4-(3,5-di-tert-butyl-4-hydroxyphenyl)phenyl phenylcarbamate.

In Examples 1 and 2, other isocyanates can be used when different N-substitution is desired. For instance, in Example 1, the use of n-octadecylisocyanate in equal mole amounts yields 4,4'-bis(2,6-di-tert-butylphenyl octadecylcarbamate).

EXAMPLE 3

To the reaction vessel of Example 1 add 512 parts of 4,4'-bis(2,6-di-cyclohexylphenol), 2000 parts of toluene and 250 parts of dimethylthiocarbamyl chloride. Heat the mixture to reflux while stirring, allowing the evolved hydrogen chloride to vent. Stir at reflux 4 hours. Wash twice at about 80° C. with 500 parts of water and then distill out 1000 parts of toluene. Cool and filter off the product, 4,4'-bis[O - (2,6-di-cyclohexylphenyl) dimethylthiocarbamate].

Other bisphenols can be converted to thiocarbamates following the above general procedure. For example, when 4,4'-bis(6-tert-butyl-o-cresol) is reacted, the product is 4,4'-bis[O-(6-tert-butyl-o-tolyl) dimethylthiocarbamate].

EXAMPLE 4

To the reaction vessel of Example 1 add 80.2 parts of 4,4' - methylenebis(2,6-di-tert-butylphenol), 71 parts of toluene, 22.8 parts of methylisocyanate and 0.2 part of pyridine. Stir and heat to reflux and maintain at reflux for 48 hours. When the white precipitate that forms makes stirring difficult, add 175 parts of toluene. Evaporate off the solvent and recrystallize the remaining yellow solids from toluene, yielding 4,4'-methylene-bis(2,6-di-tert-butylphenyl methylcarbamate).

In a similar manner, other hydrocarbyl-bridged bisphenyl carbamates can be made. For example, 4,4'-butylidenebis(6-tert-butyl-m-cresol) yields 4,4'-butylidenebis-(6-tert-butyl-m-tolyl methylcarbamate). Likewise, 4,4'-cyclohexylidenebis(6-tert-butyl-o-cresol) forms 4,4'-cyclohexylidenebis(6-tert-butyl-o-tolyl methylcarbamate). Similarly, 4,4'-isopropylidenebis[6-(α-methylbenzyl)o-cresol] yields 4,4' - isopropylidenebis[6-(α-methylbenzyl)-o-tolyl methylcarbamate].

Other isocyanates such as ethylisocyanate, dodecylisocyanate, octadecylisocyanate, eicosylisocyanate, phenylisocyanate, benzylisocyanate, and the like, can be used in the above example to obtain various N-substituted carbamates.

EXAMPLE 5

To the reaction vessel of Example 1 add 1000 parts of toluene and 340 parts of 2,2'-methylenebis(6-tert-butyl-p-cresol). While stirring, heat to 70-80° C. and over a one hour period add 262 parts of N-lauryl-N-methyl carbamyl chloride. Stir for 4 hours at 70° C. and then water wash the mixture to remove residual hydrogen chloride. Evaporate off the toluene and recrystallize the residue from isooctane, yielding 2-tert-butyl-6-(2-hydroxy-3- tert-butyl-5-methylbenzyl)-p-tolyl laurylmethylcarbamate.

An alternate method of preparing the foregoing compound is to react 2-tert-butyl-p-cresol with N-methyl-N-lauryl carbamyl chloride to obtain 2-tert-butyl-p-tolyl methyllaurylcarbamate and then react this compound with 2-hydroxy-3-tert-butyl-5-methylbenzyl chloride in a toluene or dioxane solvent employing a zinc chloride catalyst.

EXAMPLE 6

To the reaction vessel of Example 1 add 382 parts of 4,4'-butylidenebis(6-tert-butyl-m-cresol), 2000 parts of toluene and 495 parts of diphenylthiocarbamyl chloride. While stirring, heat slowly over a one hour period to reflux and stir at reflux 4 hours. Cool and distill off the toluene under vacuum. Recrystallize the residue from isooctane, yielding 4,4'-butylidenebis(6-tert-butyl-m-tolyl diphenylcarbamate).

EXAMPLE 7

In a reaction vessel equipped as in Example 1 place 358 parts of 4,4'-thiobis(6-tert-butyl-m-cresol), 1500 parts of carbon tetrachloride and 215 parts of dimethylcarbamyl chloride. Heat the mixture to reflux while stirring, allowing the evolved hydrogen chloride to vent. Stir at reflux 4 hours and then wash twice with water. Evaporate off the carbon tetrachloride and recrystallize the residue from isooctane to obtain 4,4'-thiobis(6-tert-butyl-m-tolyl dimethylcarbamate).

In the above example other N-substituted carbamyl chlorides can be employed to give their respective carbamates. For instance, dilaurylcarbamyl chloride will give 4,4'-thiobis(6-tert-butyl-m-tolyl dilaurylcarbamate). Likewise, diphenylcarbamyl chloride will result in 4,4'-thiobis-(6-tert-butyl-m-tolyl diphenylcarbamate).

In like manner, different thiobisphenols may be substituted to yield their corresponding carbamates. For example, 4,4'-thiobis(6-tert-butyl-o-cresol) yields 4,4'-thiobis(6-tert-butyl-o-tolyl dimethylcarbamate). Likewise, 4,4'-thiobis[6-(α-methylbenzyl)-o-cresol] results in 4,4'-thiobis[6 - (α-methylbenzyl)-o-tolyl dimethylcarbamate]. Similarly, 4,4' - thiobis(2,6 - di-cyclohexylphenol) forms 4,4'-thiobis[6-(α-methylbenzyl)-o-cresol] results in 4,4'-In like manner, 2,2'-dithiobis(6-tert-butyl-p-cresol) forms 2,2'-dithiobis(6-tert-butyl-p-tolyl dimethylcarbamate).

EXAMPLE 8

To a reaction vessel equipped as in Example 1 add 1500 parts of nitromethane, 418 parts of 4,4'-dithiobis (2,6-di-isopropylphenol) and 350 parts of phenylthiocarbamyl chloride. Stir and heat the mixture to 70° C. Stir for 2 hours at 70–75° C. and then cool to room temperature. Distill out the nitromethane solvent under vacuum using a steam bath for heat. Recrystallize the residue from isooctane to obtain 4,4'-dithiobis[O-(2,6-diisopropylphenyl) phenylthiocarbamate].

In an embodiment of this invention the sterically hindered bisphenyl carbamates are used as the active ingredients in insecticidal formulations. These formulations contain the sterically hindered bisphenyl carbamate as the active ingredient plus a surfactant as a dispersant therefor. Preferably, the insecticidal compositions contain an inert carrier as well as a surfactant and active ingredient. Typical surfactants and carriers employed in this embodiment are discussed below. The insecticidal formulations are used by either contacting the undesired insect with the formulation containing the active ingredient or by applying the formulation to the insect's habitat or food supply. Methods of accomplishing this are well known and are further described in the following discussion.

The surfactants or conditioning agents employed in the instant invention extend the active ingredient and promote its intimate contact with the insects and vegetation to which it is applied. They also aid in the adaptation of the active ingredients for use in conventional application equipment. In general, from 0.1 to 15 percent by weight of a surfactant is employed in the compositions of this invention; however, greater and smaller amounts can be used, if desired.

Typical examples of surfactants which are suitable for use in this invention are soaps, saponins, gelatin, casein, flour, sulfite lye, synthetic cationic, anionic, and nonionic surfactants, and the like. Detailed lists of such agents are set forth by J. W. McCutcheon in "Soap and Chemical Specialties," December 1957; January, February, March, and April 1958; and in "Detergent and Emulsifiers Up to Date—1960," John W. McCutcheon, Inc., 475 Fifth Ave., New York, N.Y. A further discussion of surface active wetting agents is set forth by D. E. H. Frear in "Chemistry of Insecticides, Fungicides and Herbicides," 277–287, published by D. Van Nostrand Company, Inc. (1948).

The materials commonly known as carriers comprise another type of ingredient which is preferably employed in the compositions of this invention. The purpose of a carrier is to extend and facilitate the application of the active ingredient. In general, carriers may be of two types; viz, solids and liquids. Liquid carriers include well-known liquids such as water and various organic formulations. Typical liquid organic carriers are petroleum fractions such as kerosene and diesel fuel, aromatics such as benzene and toluene, ketones such as acetone and methylethylketone, esters such as amyl acetate, octyl acetate, and the like.

Typical solid carriers are inert solid extenders of mineral origin such as Fuller's earth, kaolin, bentonite, China clay, various magnesium silicates, gypsum, pumice, mica, talc, attapulgite clay, and the like. Inert extenders of vegetable origin such as soy bean flour, tobacco flour, ground walnut shells, ground pecan shells, ground corn cobs, and the like, can also be employed.

The insecticidal formulations of the present invention can also beneficially contain other adjuvants. Examples of such further adjuvants are corrosion inhibitors, perfumes, dyes, odor-masking agents and stabilizers. In addition, other herbicidal, fungicidal, miticidal or insecticidal agents can be mixed with the compositions of this invention in order to obtain enhanced or dual effects from the application of the resultant composition. For example, piperonyl butoxide or piperonyl cyclonene may be included in the formulation resulting in synergistic toxic effect.

One formulation for applying the active compounds of this invention is a solution or suspension of the active compound in a suitable aqueous or organic medium. The organic medium may be a volatile solvent or it may be a higher boiling solvent such as kerosene.

When using a solution or suspension formulation, a preferred active ingredient concentration range is from about 0.5 to 100 parts by weight active ingredient per 250 parts by weight of formulation, although more or less can be used. A more preferred concentration range is from about 1 to 50 parts by weight active ingredient per 250 parts of formulation. A most preferred concentration range is from about 1 to 10 parts by weight active ingredient per 250 parts of formulation.

Emulsifiable oil formulations which are solutions or suspensions of the active compound in water-immiscible solvents together with a surface active agent may also be used. In these formulations the water-immiscible solvent is the carrier. Suitable water-immiscible solvents for the active compound of this invention are hydrocarbons such as kerosene or xylene, and water-insoluble ethers such as dibutyl Carbitol and dibutyl Cellosolve, esters such as amyl acetate and octyl acetate, and ketones such as methylethylketone or dioctylketone. The solvent concentrations may be from 50 to about 90 weight percent. The surfactant may be employed in a concentration from 0.5 to about 15 weight percent.

A preferred active ingredient concentration of the emulsifiable oil formulations of the present invention is from about 0.5 to about 10 weight percent. A more preferred active ingredient concentration in these formulations is from about 1 to about 5 weight percent. A most preferred active ingredient concentration in the emulsifiable oil formulations of this invention is from about 1 to about 3 weight percent.

The compositions of this invention may be formulated in the form of wettable powders. These are water dispersible compositions which contain, in addition to the active compound, an inert solid extender and one or more surfactants which perform the functions previously set out. The preferred inert solid extenders used in this invention are of mineral origin such as Fuller's earth, kaolin, bentonite, China clay, and the like.

A preferred active ingredient concentration of the wettable powder formulations of this invention is from about 0.05 to about 20 weight percent. A more preferred active ingredient concentration is from about 0.5 to about 10 weight percent, and a most preferred active ingredient concentration in the wettable powder formulations of this invention is from about 1 to about 5 weight percent. The surfactant concentration may be from 0.5 to about 15 weight percent and preferably from 1 to about 5 weight percent. An inert carrier may be used in the amount from 10 to 95 weight percent and more preferably from 80 to 95 weight percent.

Dusts are powder formulations which are intended for application in the dry form. The dust should be free-flowing and have a high density. Dust formulations can contain the active compounds, an inert extender, a surfactant, and may also contain a wetting agent and a grinding aid.

A preferred active ingredient concentration employed in the dust compositions of this invention is from about 0.05 to about 10 weight percent, and more preferably, from about 0.5 to about 5 weight percent. The surfactant concentration may be from about 0.01 to about 5 weight percent, and more preferably, from about 0.5 to about 1 weight percent. The balance of the dust compositions of this invention comprise inert free-flowing dust and any other adjuvants that might be desired, such as corrosion inhibitors, anti-foam agents, dyes, piperonyl butoxide, and the like.

Granule formulations may also be employed. Granules are compositions of macroscopic dimension containing the active ingredient, generally a surface active agent, and a carrier. Suitable carriers for granule formulations are clays, pyrophyllite and vermiculite.

A preferred active ingredient concentration of the granular formulations of this invention is from about 0.05 to about 10 weight percent, and more preferably, from about 0.5 to about 5 weight percent. A preferred surfactant concentration employed in the granular formulations is from about 0.01 to about 10 weight percent, and a more preferred concentration is from about .01 to about 1 weight percent. The balance of the granular formulations is preferably made up of about 15 to 30 mesh particulate inert mineral carrier.

The compounds of this invention are also effective when formulated in aerosol formulations. In these formulations, the active compounds are dissolved in an extremely volatile solvent known in the art for this purpose and maintained under pressure in a confined space.

The active ingredients described in this invention are also useful in colloidal formulations. A colloidal formulation is prepared by passing a mixture of the active ingredient, a hydrocarbon solvent, and a large amount of water through a colloid mill until homogenation of the oil and water is achieved.

The compounds used in the following Examples 9 to 16 will have the designations given below.

A. 4,4′-bis(2,6-di-tert-butylphenyl methylcarbamate)
B. 4,4′-methylenebis(2,6-di-tert-butylphenyl methylcarbamate)
C. 4,4′-methylenebis(2,6-di-tert-butylphenyl dimethylcarbamate)
D. 4,4′-thiobis(6-tert-butyl-o-tolyl methylcarbamate)
E. 4,4′-thiobis[O-(6-tert-butyl-o-tolyl) dimethylthiocarbamate]
F. 2,2′-dithiobis(6-isopropyl-p-tolyl phenylcarbamate)
G. 2,6-di-tert-butyl-4-(3,5-di-tert-butyl-4-hydroxybenzyl)phenyl methylcarbamate
H. 4,4′-cyclohexylidenebis[O-(2-isopropylphenyl) dimethylthiocarbamate]

The following examples serve to illustrate the insecticidal formulations of this invention. All percentages are by weight.

EXAMPLE 9

| | Percent |
|---|---|
| Compound A | 2.0 |
| Bentonite | 96.5 |
| Sodium alkyl benzene sulfonate | 1.0 |
| Piperonyl butoxide | 0.5 |

The above wettable powder is prepared by blending the dry components and grinding until substantially all of the particles are smaller than 50 microns.

For application, the above wettable powder is dispersed in water in quantities equivalent to about one pound of active ingredient per 50 gallons of water. The dispersion so formed is conveniently applied by the use of any of the various commercial sprayers.

EXAMPLE 10

| | Percent |
|---|---|
| Compound B | 3.0 |
| Sodium alkyl naphthalene sulfonate | 0.5 |
| Kaolin | 96.5 |

The above wettable powder is prepared in the same manner as in Example 9. For application, it is dispersed in water at a rate equivalent to about one pound of active ingredient per 50 gallons of water.

EXAMPLE 11

| | Percent |
|---|---|
| Compound C | 10 |
| Talc | 80 |
| Diatomaceous silica | 8 |
| Fatty acid amides | 2 |

The above dust is prepared by first grinding together the active ingredients, diatomaceous silica and fatty acid amide and then blending in the talc and thoroughly mixing.

This dust formulation can be applied using a tractor or airplane-mounted duster, at a rate of about 5 pounds of active ingredient per acre, resulting in control of most insects.

EXAMPLE 12

| | Percent |
|---|---|
| Compound D | 10 |
| Diesel fuel | 80 |
| Alkylaryl polyether alcohols | 10 |

The above emulsifiable oil is prepared by mixing the components until a homogeneous solution results.

The above composition is conveniently applied by dispersing the composition in water at a rate equivalent to two pounds of active ingredient per 30 gallons of water. It may then be applied using any suitable commercial sprayer.

In the above example, similar formulations are prepared containing 0.05, 0.5, 1, 2, 3, 4, 5, 7 or 9 percent Compound D.

EXAMPLE 13

| | Percent |
|---|---|
| Compound E | 10 |
| Sodium alkyl naphthalene sulfonate | 5 |
| 15–30 mesh attapulgite | 85 |

The above granular composition is prepared by first dissolving the active ingredient and surface active agent in acetone and then spraying the solution on the carrier. Following this, the granules are dried. They may then be applied to plant tissue and ground area at a rate of from about 1 to 10 pounds of active ingredient per acre, giving good insect control.

In the above example, similar formulations are prepared containing 0.5, 1 or 5 percent of Compounds D and E.

EXAMPLE 14

Into a cylinder rated at 100 p.s.i.g. working pressure is introduced 5 parts of Compound F. The cylinder is then made pressure tight except for one opening, through which is introduced a mixture of 1 part of pyrethrum extract and 90 parts of dichlorodifluoromethane propellant from a container holding this material under pressure. The cylinder into which the ingredients have been introduced is then sealed off and shaken to give a uniform solution of the active compound in the volatile solvents. When sprayed through a small orifice nozzle into the atmosphere this solution will form an effective aerosol of the active compound employed.

In the above example, similar formulations are prepared containing 10, 30, 60 and 90 percent of Compound F.

EXAMPLE 15

A colloidal formulation is prepared by passing a mixture of 10 parts of Compound G, 100 parts of kerosene, 1000 parts of water, and 1 part of mannitan monooleate through the colloid mill until homogenation of the oil in water is achieved.

EXAMPLE 16

An insecticidal composition for use in filling aerosol generating containers is prepared by placing in a closed pressure vessel the following ingredients, on a parts by weight basis.

| | |
|---|---|
| Compound H | 10 |
| Piperonyl butoxide | 2 |
| Polymerized alkylated naphthalene | 15 |

Following this, 125 parts of dichlorodifluoromethane is injected under pressure and the mixture stirred until the ingredients dissolve. The formulation is then ready for use in filling aerosol containers.

The compositions of this invention are also useful for controlling the growth of undesirable vegetation. They are phytotoxic to many undesirable plants. Generally, higher concentrations are used when herbitoxic results are desired. For example, the active ingredient content in the foregoing Examples 9–16 may be increased about five to ten-fold when herbitoxic results are desired. The exact dosage varies with the vegetation being treated, the weather and the stage in the growth cycle. Those skilled in the art are well aware of methods of determining proper application rates. Generally, best herbicidal results are obtained with the compounds of this invention when applied early in the growing season, even during the pre-germination period.

The sterically hindered bisphenyl carbamates described in this invention are also useful as antioxidants in organic material normally subject to oxidative deterioration. For example, they may be employed in amounts from about 0.05 to 5 weight percent to stabilize organic material such as mineral lubricating oils, synthetic lubricating oils such as di-2-ethylhexyl sebacate, di-2-ethylhexyl azelate, ethyleneglycol dipelargonate, pentaerythritol tetrapelargonate, trimethylolethane tripelargonate, and the like. Other organic material that can be stabilized includes natural and synthetic rubber. They are especially useful in the newer synthetic rubbers such as poly-cis-butadiene, ethylene-propylene rubber, ethylene-propylene-diene terpolymer wherein the diene polymer is a nonconjugated diene such as dicyclopentadiene, 1,4-di-pentene, and the like. They are also useful in polychloroprene, polyisoprene, SBR rubber, nitrile rubber, synthetic silicone lubricants and fats and oils of animal and vegetable origin.

The hindered bisphenyl carbamates are especially useful in stabilizing homopolymers and copolymers of olefinically unsaturated monomers. Some examples of these are polyethylene, polypropylene, polybutene, polybutadiene, styrene-butadiene acrylonitrile terpolymer, and the like. The following example illustrates the stabilization of a polyolefin with the new bisphenyl carbamates described in this invention.

EXAMPLE 17

In a mixing vessel place 1000 parts of a high molecular weight crystalline polypropylene powder made employing a Ziegler type catalyst (diethyl aluminum chloride/titanium trichloride). To this powder is added one part of 4,4'-methylenebis(2,6-di-tert-butylphenyl methylcarbamate) and 2 parts of dilaurylthiodipropionate. The polymer is mixed until homogeneous and then used in any of the well-known methods to fabricate polypropylene articles. In the above example, the other sterically hindered bisphenyl carbamates described in this invention can be employed with good results.

I claim:
1. A compound having the formula

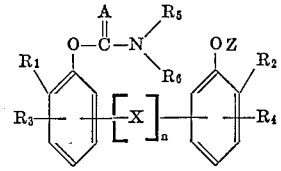

wherein $R_1$ and $R_2$ are selected from the group consisting of alpha-branched $C_{3-12}$ alkyl radicals, $\alpha$-methylbenzyl radicals and cyclohexyl radicals, $R_3$ and $R_4$ are selected from the group consisting of hydrogen, $C_{1-12}$ alkyl radicals, $\alpha$-methylbenzyl radicals and cyclohexyl radicals, X is selected from the group consisting of thio- and dithio- radicals, $R_5$ is a $C_{1-20}$ acyclic alkyl radical, $R_6$ is selected from the group consisting of hydrogen and $R_5$, $n$ is an integer from 0–1, A is selected from the group consisting of oxygen and sulfur, and Z is selected from the group consisting of hydrogen and carbamyl radicals having the formula:

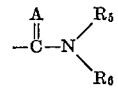

2. 4,4'-bis(2,6-di-tert-butylphenyl methylcarbamate).
3. 2,2' - methylenebis(6-tert-butyl-p-tolyl methylcarbamate).
4. 4,4'-thiobis(6-tert-butyl-o-tolyl methylcarbamate).
5. 4,4'-thiobis(6-tert-butyl-m-tolyl methylcarbamate).

References Cited
UNITED STATES PATENTS 3,107,261  10/1963  Gerber _____ 260—453

JAMES A. PATTEN, Primary Examiner

U.S. Cl. X.R.

71—100, 106; 252—401, 404; 260—45.85, 410.6, 455, 471, 485; 424—300

PO-1050
(5/69)

UNITED STATES PATENT OFFICE
CERTIFICATE OF CORRECTION

Patent No. _____3,632,631_____ Dated _____January 4, 1972_____

Inventor(s) _____William E. Wright_____

It is certified that error appears in the above-identified patent and that said Letters Patent are hereby corrected as shown below:

Column 2, Formula (III), "$-N\begin{smallmatrix}R_5\\R_6\end{smallmatrix}$" should be bonded to the "C" rather than the "O"; insert "OZ" at the top of the second benzene ring in the formula.

Column 4, line 73, "4,4'-thiobis[6-(α-methylbenzyl)-o-cresol] results in 4,4'-" should read -- 4,4'-thiobis(2,6-di-cyclohexylphenyl dimethylcarbamate).

Claim 1, after the second formula insert -- wherein A, $R_5$ and $R_6$ are as above. --

Signed and sealed this 6th day of June 1972.

(SEAL)
Attest:

EDWARD M. FLETCHER, JR.
Attesting Officer

ROBERT GOTTSCHALK
Commissioner of Patents